April 9, 1946.    R. S. CURRY, JR    2,397,949
MAGNETIC COUPLING MEANS FOR CONTROLLING GYRO INSTRUMENTS
Filed Aug. 11, 1942

INVENTOR
R. S. CURRY, JR.
BY Herbert P. Thompson
ATTORNEY

Patented Apr. 9, 1946

2,397,949

UNITED STATES PATENT OFFICE 2,397,949

MAGNETIC COUPLING MEANS FOR CONTROLLING GYRO INSTRUMENTS

Robert S. Curry, Jr., Baldwin, N. Y., assignor to Sperry Gyroscope Company, Inc., Brooklyn, N. Y., a corporation of New York Application August 11, 1942, Serial No. 454,474

3 Claims. (Cl. 172—36)

This invention relates, generally, to gyro instruments and particularly concerns a novel means for exerting a precession effecting torque about the axis of the gyro rotor bearing case of a free instrument of this character by which it is slaved to or maintained in oriented azimuthal relation with respect to the sensitive element of a magnetic compass.

One of the features of the invention resides in the utilization of a magnetic couple to obtain a force or the precessing torque which includes a disc-shaped permanent magnet member as one of the parts thereof.

Another feature of the invention is contained in the provision of a coil member of reversible polarity which is positioned in the gyro instrument for movement relative to a magnet member of the character stated.

Further features of the invention reside in the structural provisions herein shown for the stator or coil member of the magnetic couple-producing means by which the core of the same is arranged to encircle the magnetic member.

Additionally, an object of the present invention resides in providing a D. C. torque motor, comprising a generally disc-shaped permanent magnet and a core carrying an exciting winding, in which the core is arranged in concentric encircling relation to the magnet and in which the magnet and core are so constructed, correlated and arranged as to provide an air gap therebetween of substantially uniform length and a magnetic circuit of substantially constant reluctance for all relatively rotated positions of the permanent magnet and core.

Other features and structural details of the invention will be apparent from the following description when read in connection with the accompanying drawing, wherein Fig. 1 is a side elevation of a gyro instrument constructed in accordance with the present invention with the outer casing thereof shown in section.

Figure 1:
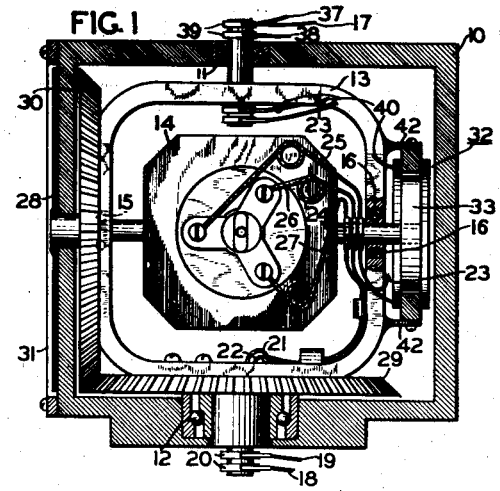
Figure 6:
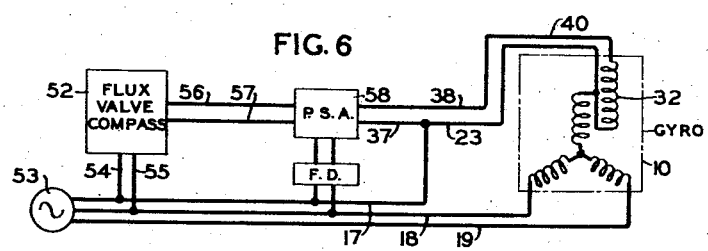
Fig. 6 is a schematic wiring diagram illustrating an electrical arrangement for controlling the torque-exerting, magnetic coupling means of the present invention by energizing the coil member thereof.

With reference to Figs. 1 and 6, the gyro instrument illustratively employed to describe the present inventive subject matter is shown to include an outer casing 10 which contains upper and lower bearings indicated at 11 and 12, respectively, by which a conventional ring 13 is mounted for movement about a vertical axis. The gyro rotor bearing case 14 of the instrument is pivotally mounted in the usual fashion between the upwardly extending arms of the ring by means of bearings 15 and 16 which support the case for movement about a horizontal axis. The gyro rotor (not shown) is mounted to spin within the rotor bearing case 14 on a normally horizontal axis perpendicular to both the axis of the case and the axis of the vertical ring 13. The conventional gyro instrument shown is consequently provided with vertical and horizontal axes of free support by the ring 13 and case 14, respectively. In the present instance, any suitable means may be provided to spin the gyro rotor such as an electric motor (not shown) which is supplied with three-phase alternating current energy from a suitable source 53 by way of leads 17, 18 and 19, suitable slip rings 20 for leads 18—19 and 39 for lead 17 on the respective trunnions of the vertical ring 13, leads 21, 22 and 23, suitable slip rings 24 on one of the trunnions of the rotor bearing case 14 and leads 25, 26 and 27 to the stator of the gyro rotor spinning motor. An azimuthal heading indication is obtained from the described type of gyro instrument by a compass card 28 which is suitably mounted within the casing 10. Compass card 28 is moved by the vertical ring 13 which is connected to the same by way of the meshing bevel gears 29 and 30 in the construction shown. A suitable lubber line (not shown) may be provided on the surface of the window 31 of the instrument for comparison with the indicating face of the compass card 28 by the observer in determining the indication given by the instrument.

The conventional free gyro instrument described is converted to an instrument having north seeking properties by slaving the same to a magnetic compass which may be of the flux valve type as schematically shown in Fig. 6. The controlling influence of the compass is exerted upon the gyro instrument by means of the magnetic coupling or torque motor forming the subject matter of the present invention. The coil member of the magnetic coupling means of the present invention is designated generally at 32 and the disc-shaped permanent magnet which cooperates with the same is indicated at 33. The coupling parts are positioned in the gyro instrument for movement relative to one another and the magnet 33 is preferably employed in the form of a rotor which is arranged in coaxial relation to the axis of the rotor bearing case 14. The stator of the coupling may be considered to be the coil member which is arranged in encircling relation to the magnetic rotor.

Figure 2:
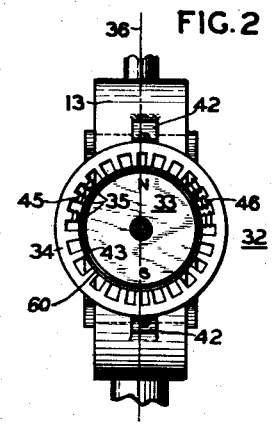
Fig. 2 is a detail side elevation of the vertical ring and one of the magnetic coupling combinations forming the subject matter of the present invention.

In the form of the invention shown in Figs. 1 and 2, the coil or stator member 32 of the torque motor or torque exerting magnetic couple is formed by a core 34 which is circular in shape and includes a number of radially extending, relatively spaced, pole pieces 35 whose end faces are arranged in concentric relation to the periphery of the magnetic rotor 33. This core may be semicircular or ring-shaped, the same being preferably employed in the last noted shape as illustrated in Fig. 2. When used as shown, the core 34 is wound so that the windings 45 on the half-portion to the left of line 36, Fig. 2, are reversed in direction to the windings 46 on the half-portion to the right of the line. The respective poles in each of the half-portions of the stator are opposite in polarity. By reversing the direction of current flow through the windings of the stator the polarity of the same may be reversed in a desired manner to control the direction of application of the force causing precession of the vertical ring 13. The direct current controlling signal for the coupling means is led to the stator or coil member by way of leads 37—23 and 38, slip rings 39 and leads 23 and 40. The coil member or stator 32 is fixedly mounted on the side of the vertical ring 13 by means of two extending lugs 42 to which it is connected.

The disc-shaped magnetic rotor 33 is fixedly mounted on an extension of one of the arms of the trunnions by which the rotor bearing case is pivotally mounted with the axis thereof arranged in coaxial relation to the axis of the case. Rotor 33 is cast in a circular shape and the side surfaces are ground flat. The rotor is positioned as shown in Fig. 2, with the polar ends of the same, in this instance, situated above and below a horizontal plane which intersects the axis of the rotor bearing case 14. The respective fields produced by the parts of the magnetic couple are consequently displaced in a vertical plane by 90° and the combination thereof results in a directed force exerted about the axis of the rotor bearing case 14 which in a manner well known in the art is effective to cause precessional movement of the ring 13 and consequently position the compass card 28. The torque exerting means is effective only when the coil member or stator is energized by an incoming signal which may be such as hereinafter more particularly described. In this form of the invention, an annular member 60 constructed of magnetically permeable material is preferably situated between the coupling parts, the same being positioned against the inwardly disposed end faces of the respective pole pieces 35. It will be understood that the coupling parts are suitably insulated with respect to the gyro parts on which the same are mounted.

Figure 3:
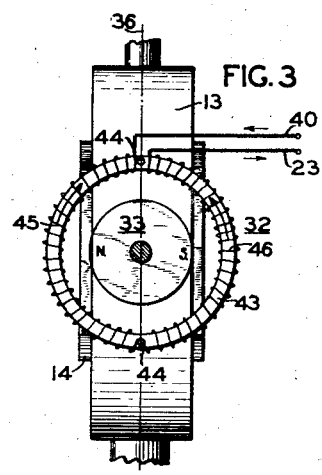
Fig. 3 is a view similar to Fig. 2 showing a modified coil member or stator construction.

In the form of the invention illustrated in Fig. 3, the stator 32 is provided by an annular core 43 of permeable magnetic material which is mounted on the side of the vertical ring 13 through means of pins 44 in concentric relation to the periphery of the permanent magnet 33. Half-sections of the core 43 are wound in opposite directions as noted by the respective windings 45 and 46. With this type of stator, the permanent magnet 33 is positioned so that its respective poles are normally situated on opposite sides of a vertical plane which intersects the axis of the rotor bearing case 14.

Figure 4:
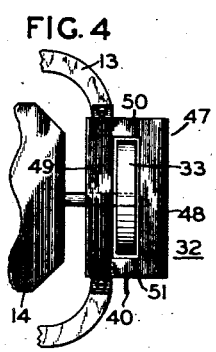
Fig. 4 is a detail side elevation of a portion of the gyro instrument in which a further modified form of coil member for the magnetic couple is illustrated.
Figure 5:
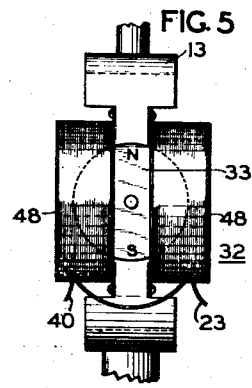
Fig. 5 is a view similar to Figs. 2 and 3 but of the embodiment of the invention shown in Fig. 4.

With reference to Figs. 4 and 5, the stator 32 is shown as formed by two parallel spaced coil members which are connected in series relation to form a single unit which operates in the manner previously described. These members are also fixedly mounted in a suitable fashion on the vertical ring 13 and are situated equidistantly to either side of a vertical plane intersecting the axis of the rotor bearing case. Each of the stators 32 in this instance, preferably include spools 47, Fig. 4, which are rectangular in shape and carry the coils. Oppositely disposed legs 48, 49 and 50, 51 of these spools encircle the flat end faces and the rim, respectively, of the disc-shaped permanent magnet 33. With this construction, the width of the upright side of the ring 13 on which the coil member is mounted is reduced in size in order to permit the respective coils to be mounted close together. It is obvious that by changing the construction of the vertical ring 13, a single centrally positioned coil member could be employed in this connection.

The coil members or stators 32 are energized by suitable means which may be of the type schematically shown in Fig. 6 and more particularly shown and described in my copending application Serial No. 435,625, filed March 21, 1942, for an improved Gyro flux valve compass system. In the instance shown, such means is in the form of a phase sensitive amplifier 58 whose direct current output is led by way of leads 37—23 and 38 to the stator or coil member 32. The gyro controlling flux valve compass is indicated at 52 in this figure, the same being energized from the suitable alternating current source 53 by way of leads 54 and 55. The output of the compass is fed to the phase sensitive amplifier through leads 56 and 57.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A D. C. torque motor comprising a generally disc-shaped permanent magnet and a core arranged in concentric encircling relation to said magnet and having an exciting winding mounted thereon, said winding being connected in circuit with a source of direct current and a control means therefor, said permanent magnet and core being mounted for relative rotation and being so constructed, correlated and arranged as to provide an air gap therebetween of substantially uniform length and a magnetic circuit of substantially constant reluctance for all relatively rotated positions thereof.

2. A D. C. torque motor comprising a generally disc-shaped permanent magnet and a continuous and uninterrupted annular core arranged in concentric relation thereto, said core encircling the periphery of the permanent magnet in closely spaced relation thereto, and an exciting coil mounted on said core, said coil being connected in circuit with a source of direct current and a control means therefor, said magnet and core being mounted for relative rotation and having an air gap therebetween of substantially uniform length and forming a magnetic circuit of substantially constant reluctance for all relatively rotated positions thereof.

3. A D. C. torque motor comprising a generally disc-shaped permanent magnet and an annular core arranged in relatively rotatable relationship, said core encircling said permanent magnet and comprising poles extending radially and inwardly toward said magnet, and an annular element formed in its entirety of permeable magnetic material positioned adjacent the inner ends of said poles and concentrically between the poles of said core and said permanent magnet, said permanent magnet and said annular element having an air gap therebetween of substantially uniform length and providing a magnetic circuit of substantially constant reluctance for all relative positions of said permanent magnet and said core.

ROBERT S. CURRY, Jr.